United States Patent
Park et al.

(10) Patent No.: US 11,161,978 B2
(45) Date of Patent: Nov. 2, 2021

(54) THERMOPLASTIC RESIN COMPOSITION AND MOLDED PRODUCT USING SAME

(71) Applicant: Lotte Advanced Materials Co., Ltd., Yeosu-si (KR)

(72) Inventors: Jungwoo Park, Uiwang-si (KR); Myunghun Kim, Uiwang-si (KR); Keehae Kwon, Uiwang-si (KR)

(73) Assignee: Lotte Chemical Corporation, Seoul (KR)

(*) Notice: Subject to any disclaimer, the term of this patent is extended or adjusted under 35 U.S.C. 154(b) by 207 days.

(21) Appl. No.: 16/473,075

(22) PCT Filed: Dec. 27, 2017

(86) PCT No.: PCT/KR2017/015587
§ 371 (c)(1),
(2) Date: Jun. 24, 2019

(87) PCT Pub. No.: WO2018/124748
PCT Pub. Date: Jul. 5, 2018

(65) Prior Publication Data
US 2019/0352499 A1    Nov. 21, 2019

(30) Foreign Application Priority Data

Dec. 30, 2016 (KR) .................. 10-2016-0184152

(51) Int. Cl.
*C08L 69/00* (2006.01)
(52) U.S. Cl.
CPC ......... *C08L 69/00* (2013.01); *C08L 2205/035* (2013.01)
(58) Field of Classification Search
CPC .......... C08L 69/00; C08L 25/12; C08L 55/02; C08L 67/02; C08L 33/12
See application file for complete search history.

(56) References Cited

U.S. PATENT DOCUMENTS

| | | | |
|---|---|---|---|
| 5,424,361 A | 6/1995 | De Rudder | |
| 7,714,066 B2 | 5/2010 | Seidel et al. | |
| 8,349,926 B2 | 1/2013 | Eckel et al. | |
| 9,771,476 B2 | 9/2017 | Kim et al. | |
| 2006/0241243 A1* | 10/2006 | Seidel | C08L 69/00 525/67 |
| 2012/0065318 A1 | 3/2012 | Park et al. | |
| 2012/0129989 A1 | 5/2012 | Kim et al. | |
| 2013/0158161 A1* | 6/2013 | Kim | C08L 69/00 523/122 |
| 2016/0312026 A1* | 10/2016 | Kim | C08L 69/00 |

FOREIGN PATENT DOCUMENTS

| | | |
|---|---|---|
| CN | 102459459 A | 5/2012 |
| CN | 103958599 A | 7/2014 |
| CN | 104693750 A | 6/2015 |
| EP | 0606558 B1 | 4/1997 |
| JP | 2965845 B2 | 10/1999 |
| JP | 2011-153294 A | 8/2011 |
| JP | 5314311 B2 | 10/2013 |
| KR | 10-0680338 B1 | 2/2007 |
| KR | 10-2007-0122496 A | 12/2007 |
| KR | 10-1212673 | 12/2012 |
| KR | 10-2013-0070051 A | 6/2013 |
| KR | 10-2016-0062859 A | 8/2017 |
| KR | 10-2016-0070343 A | 9/2017 |
| KR | 10-2016-0022257 A | 11/2017 |
| KR | 10-2016-0127262 A | 11/2017 |
| WO | 2011-073289 A1 | 6/2011 |
| WO | 2018/124748 A1 | 7/2018 |

OTHER PUBLICATIONS

Office Action in counterpart Chinese Application No. 201780081331.4 dated Jan. 5, 2021, pp. 1-8.
English-translation of Office Action in counterpart Chinese Application No. 201780081331.4 dated Jan. 5, 2021, pp. 1-7.
International Search Report in counterpart International Application No. PCT/KR2017/015587 dated Apr. 5, 2018, pp. 1-4.

* cited by examiner

Primary Examiner — Mark S Kaucher
(74) Attorney, Agent, or Firm — Additon, Pendelton & Witherspoon, P.A.

(57) ABSTRACT

The present invention relates to a thermoplastic resin composition and a molded product using the same, wherein the thermoplastic resin composition comprising: (A) a polycarbonate resin; (B) an aromatic vinyl compound-vinyl cyanide compound copolymer with a vinyl cyanide compound content of 32 wt % to 35 wt %; (C-1) a first acrylonitrile-butadiene-styrene graft copolymer with an average particle diameter of a rubber polymer of 200 nm to 350 nm; (C-2) an acrylonitrile-butadiene-styrene copolymer including a second acrylonitrile-butadiene-styrene graft copolymer with an average particle diameter of a rubber polymer of 400 nm to 600 nm; (D) a polybutylene terephthalate resin; and (E) a compatibilizer.

14 Claims, No Drawings

THERMOPLASTIC RESIN COMPOSITION AND MOLDED PRODUCT USING SAME

CROSS-REFERENCE TO RELATED APPLICATIONS

This application claims priority to and the benefit of International Application No. PCT/KR2017/015587, filed Dec. 27, 2017, which published as WO 2018/124748 on Jul. 5, 2018; and Korean Patent Application No. 10-2016-0184152, filed in the Korean Intellectual Property Office on Dec. 30, 2016, the entire disclosure of each of which is incorporated herein by reference.

TECHNICAL FIELD

A thermoplastic resin composition and a molded product using the same are disclosed.

BACKGROUND ART

A polycarbonate resin is widely used as one of engineering plastics in a plastic industry.

The polycarbonate resin has a glass transition temperature (Tg) reaching about 150° C. due to a bulky molecular structure such as bisphenol-A and thus shows high heat resistance and also has flexibility and rigidity given by a carbonyl group of a carbonate group having high rotating mobility. In addition, it is an amorphous polymer and thus has excellent transparency characteristics.

However, the polycarbonate resin may have a drawback of reduced flowability and thus, may also be largely used as alloys with various resins in order to complement workability and post-processability.

Of these, a polycarbonate/acrylonitrile-butadiene-styrene copolymer (PC/ABS) alloy has excellent durability, heat resistance, impact resistance, and the like and may be applied to vast fields such as electricity electronics, an auto, an architecture, miscellaneous real life materials, and the like.

However, the PC/ABS alloy has low stability of heat discoloration and low ultraviolet (UV) stability. Therefore, the molded product is rarely used as a direct part, and the problem is solved by proper post-processing, specifically plating, painting, water transferring, and the like.

Among them, painting is the most common type of post-processing, and various colors may be implemented. It is relatively inexpensive as compared with other post-processing processes and is widely used for general purpose.

In general, painting is performed in a process order of molding a part, etching the surface of the part, applying/drying and coating a painting solution thereon, and the like, and herein, since the painting solution mostly includes an organic compound solvent, a part defect generated during the molding process such as an injection molding and the like, that is, an abnormal appearance including a surface defect, a surface weld, a flow mark, or the like may not only further stand out, but also a residual stress of the part after the molding may generate a painting defect due to the organic compound solvent.

This abnormal appearance or a crack, an erosion, and nonuniformity of painting appearance on the surface after the painting due to the painting defect may be partly improved through the process, but the process becomes more complex, and the improvement is still insignificant and cannot be a fundamental solution.

In addition, an attempt to use an acryl-based plasticizer in order to improve the painting and the like has been made but still has a limit in improving painting properties and also a problem of deteriorating flowability.

Accordingly, research on preparing a polycarbonate resin composition maintaining flowability as well as excellent characteristics of a PC/ABS alloy such as impact resistance and the like and showing improved painting properties by improving painting properties of a material itself in order to solve the above problem has been made.

DISCLOSURE

Technical Problem

A thermoplastic resin composition having excellent painting properties, impact resistance, chemical resistance, and flowability and a molded product using the same are provided.

Technical Solution

A thermoplastic resin composition according to an embodiment of the present invention includes (A) a polycarbonate resin; (B) an aromatic vinyl compound-vinyl cyanide compound copolymer with a vinyl cyanide compound content of 32 wt % to 35 wt %; an acrylonitrile-butadiene-styrene copolymer including (C-1) a first acrylonitrile-butadiene-styrene graft copolymer with an average particle diameter of a rubber polymer of 200 nm to 350 nm; and (C-2) a second acrylonitrile-butadiene-styrene graft copolymer with an average particle diameter of a rubber polymer of 400 nm to 600 nm; (D) a polybutylene terephthalate resin; and (E) a compatibilizer.

The aromatic vinyl compound-vinyl cyanide compound copolymer (B) with the vinyl cyanide compound content of 32 wt % to 35 wt % may have a weight average molecular weight of 100,000 g/mol to 120,000 g/mol.

The thermoplastic resin composition may further include (B') an aromatic vinyl compound-vinyl cyanide compound copolymer with a vinyl cyanide compound content of 27 wt % to 30 wt %.

The aromatic vinyl compound-vinyl cyanide compound copolymer (B') with the vinyl cyanide compound content of 27 wt % to 30 wt % may have a weight average molecular weight of 130,000 g/mol to 140,000 g/mol.

The aromatic vinyl compound-vinyl cyanide compound copolymer (B) with the vinyl cyanide compound content of 32 wt % to 35 wt % may be included in a larger amount than the aromatic vinyl compound-vinyl cyanide compound copolymer (B') with the vinyl cyanide compound content of 27 wt % to 30 wt %.

The thermoplastic resin composition may include (A) 40 wt % to 60 wt % of the polycarbonate resin; (B) 8 wt % to 22 wt % of the aromatic vinyl compound-vinyl cyanide compound copolymer with the vinyl cyanide compound content of 32 wt % to 35 wt %; (B') 7 wt % to 12 wt % of the aromatic vinyl compound-vinyl cyanide compound copolymer with the vinyl cyanide compound content of 27 wt % to 30 wt %; the acrylonitrile-butadiene-styrene graft copolymer including (C-1) 10 wt % to 15 wt % of the first acrylonitrile-butadiene-styrene graft copolymer with the average particle diameter of the rubber polymer of 200 nm to 350 nm; and (C-2) 6 wt % to 12 wt % of the second acrylonitrile-butadiene-styrene graft copolymer with the average particle diameter of the rubber polymer of 400 nm to 600 nm; (D) 3 wt % to 8 wt % of the polybutylene terephthalate resin; and (E) 1 wt % to 5 wt % of the compatibilizer based on a total amount of the thermoplastic resin composition.

In the aromatic vinyl compound-vinyl cyanide compound copolymer, the vinyl cyanide compound may be selected from the group consisting of acrylonitrile, methacrylonitrile, fumaronitrile, and a combination thereof.

In the aromatic vinyl compound-vinyl cyanide compound copolymer, the aromatic vinyl compound may be selected from the group consisting of styrene, α-methylstyrene, and a combination thereof which are substituted or unsubstituted with a halogen or a C1 to C10 alkyl group.

The aromatic vinyl compound-vinyl cyanide compound copolymer may be a styrene-acrylonitrile copolymer (SAN).

The second acrylonitrile-butadiene-styrene graft copolymer (C-2) may be included in an amount of 15 parts by weight to 40 parts by weight based on 100 parts by weight of the polycarbonate resin (A).

The compatibilizer (E) may be a copolymer of an acryl-based compound and a compound copolymerizable with the acryl-based compound.

The compatibilizer (E) may be a copolymer of ethylacrylate and methylmethacrylate.

The compatibilizer (E) may be a copolymer of a monomer mixture including 30 wt % to 70 wt % of the ethylacrylate and 70 wt % to 30 wt % of the methylmethacrylate.

In another embodiment of the present invention, a molded product using the thermoplastic resin composition is provided.

Advantageous Effects

The thermoplastic resin composition of the present invention may provide a thermoplastic resin composition having improved painting properties due to a sharply reduced defect such as a flow mark, a weld line, and the like by optimizing components and contents of a polycarbonate resin, an aromatic vinyl compound-vinyl cyanide compound copolymer, an acrylonitrile-butadiene-styrene graft copolymer, a polybutylene terephthalate resin, and a compatibilizer and using an acryl-based compound as the compatibilizer and a molded product manufactured therefrom.

In addition, the thermoplastic resin composition of the present invention may provide a thermoplastic resin composition having improved painting properties and a molded product manufactured therefrom and having excellent appearance by maintaining excellent characteristics of a thermoplastic resin itself by mixing acrylonitrile-butadiene-styrene graft copolymers using rubber polymers having a different average particle diameter in a predetermined ratio and limiting a content of an acrylonitrile-butadiene-styrene graft copolymer having a larger average particle diameter based on that of the polycarbonate resin and the molded product manufactured therefrom.

In addition, the thermoplastic resin composition of the present invention has improved painting properties and realizes excellent appearance of the molded product and thus may be coated as a single layer instead of a conventional double layer of an upper layer/a lower layer, and accordingly, the painting process may be simplified and has an economical effect.

MODE FOR INVENTION

Hereinafter, embodiments of the present invention are described in detail. However, these embodiments are exemplary, the present disclosure is not limited thereto and the present disclosure is defined by the scope of claims.

In the present specification, when a definition is not otherwise provided, "copolymerization" may refer to block copolymerization, random copolymerization, graft copolymerization or alternate copolymerization, and "copolymer" may refer to a block copolymer, a random copolymer, a graft copolymer or an alternate copolymer.

In an embodiment of the present invention, a thermoplastic resin composition includes (A) a polycarbonate resin; (B) an aromatic vinyl compound-vinyl cyanide compound copolymer with a vinyl cyanide compound content of 32 wt % to 35 wt %; (C-1) a first acrylonitrile-butadiene-styrene graft copolymer with an average particle diameter of a rubber polymer of 200 nm to 350 nm; (C-2) an acrylonitrile-butadiene-styrene copolymer including a second acrylonitrile-butadiene-styrene graft copolymer with an average particle diameter of a rubber polymer of 400 nm to 600 nm; (D) a polybutylene terephthalate resin; and (E) a compatibilizer.

Hereinafter, each component of the thermoplastic resin composition is described in detail.

(A) Polycarbonate Resin

The polycarbonate resin (A) is a polyester having a carbonate bond, is not particularly limited, and may be any polycarbonate that is usable in a field of a resin composition.

For example, the polycarbonate resin may be prepared by reacting diphenols represented by Chemical Formula 1 with phosgene, halogenic acid ester, carbonate ester, or a combination thereof.

[Chemical Formula 1]

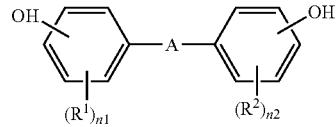

In Chemical Formula 1,

A is a linking group selected from a single bond, a substituted or unsubstituted C1 to C30 alkylene group, a substituted or unsubstituted C2 to C5 alkenylene group, a substituted or unsubstituted C2 to C5 alkylidene group, a substituted or unsubstituted C1 to C30 haloalkylene group, a substituted or unsubstituted C5 to C6 cycloalkylene group, a substituted or unsubstituted C5 to C6 cycloalkenylene group, a substituted or unsubstituted C5 to C10 cycloalkylidene group, a substituted or unsubstituted C6 to C30 arylene group, a substituted or unsubstituted C1 to C20 alkoxylene group, a halogenic acid ester group, a carbonate ester group, CO, S, and $SO_2$, $R^1$ and $R^2$ are independently a substituted or unsubstituted C1 to C30 alkyl group or a substituted or unsubstituted C6 to C30 aryl group, and n1 and n2 are independently an integer ranging from 0 to 4.

Two or more types of the diphenols represented by Chemical Formula 1 may be combined to constitute a repeating unit of a polycarbonate resin.

Specific examples of the diphenols may be hydroquinone, resorcinol, 4,4'-dihydroxydiphenyl, 2,2-bis(4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3-methyl-4- hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like. Among the diphenols, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, or 1,1-bis(4-hydroxyphenyl)cyclohexane may be desirably used. 2,2-bis(4-hydroxyphenyl)propane may be more desirably used.

The polycarbonate resin may be a mixture of copolymers obtained using two or more types of diphenols that differ from each other.

In addition, the polycarbonate resin may be a linear polycarbonate resin, a branched polycarbonate resin, a polyestercarbonate copolymer resin, and the like.

Specific examples of the linear polycarbonate resin may be a bisphenol-A polycarbonate resin. Specific examples of the branched polycarbonate resin may be a polymer prepared by reacting a multi-functional aromatic compound such as trimellitic anhydride, trimellitic acid, and the like with diphenols and a carbonate. The polyester carbonate copolymer resin may be prepared by reacting bifunctional carboxylic acid with diphenols and carbonate, wherein the used carbonate is diaryl carbonate such as diphenyl carbonate or ethylene carbonate.

The polycarbonate resin may have a weight average molecular weight of 10,000 g/mol to 200,000 g/mol, for example, 14,000 g/mol to 40,000 g/mol. When the polycarbonate resin has a weight average molecular weight within the ranges, excellent impact resistance and flowability may be obtained. In addition, two different types of the polycarbonate resin having a different weight average molecular weight or a different flow index may be mixed and used in order to satisfy desirable flowability.

When the thermoplastic resin composition is prepared, the polycarbonate resin may be included in an amount of 40 wt % to 60 wt %, preferably 45 wt % to 55 wt % based on 100 wt % of the thermoplastic resin composition. When the polycarbonate resin is used in an amount of less than 40 wt %, appearance characteristics are not sufficient, but when the polycarbonate resin is used in an amount of greater than 60 wt %, flowability may be deteriorated.

(B, B', B") Aromatic Vinyl Compound-Vinyl Cyanide Compound Copolymer

The aromatic vinyl compound-vinyl cyanide compound copolymer (B, B', B") is formed by a copolymerization of a vinyl cyanide compound and an aromatic vinyl compound.

The vinyl cyanide compound may be selected from the group consisting of acrylonitrile, methacrylonitrile, fumaronitrile, and a combination thereof.

The aromatic vinyl compound may be selected from the group consisting of styrene, α-methylstyrene, and a combination thereof which are substituted or unsubstituted with a halogen or a C1 to C10 alkyl group.

The aromatic vinyl compound-vinyl cyanide compound copolymer may be a styrene-acrylonitrile copolymer (SAN).

The thermoplastic resin composition according to an embodiment may include a copolymer (B) formed by a copolymerization of 32 wt % to 35 wt % of the vinyl cyanide compound and 65 wt % to 68 wt % of the aromatic vinyl compound.

The aromatic vinyl compound-vinyl cyanide compound copolymer (B) with the vinyl cyanide compound content of 32 wt % to 35 wt % may have a weight average molecular weight of 100,000 g/mol to 120,000 g/mol.

The thermoplastic resin composition according to an embodiment may include a copolymer (B') formed by a copolymerization of 27 wt % to 30 wt % of the vinyl cyanide compound and 70 wt % to 73 wt % of the aromatic vinyl compound.

The aromatic vinyl compound-vinyl cyanide compound copolymer (B') with the vinyl cyanide compound content of 27 wt % to 30 wt % may have a weight average molecular weight of 130,000 g/mol to 140,000 g/mol.

The thermoplastic resin composition according to an embodiment may include a copolymer (B") formed by a copolymerization of 22 wt % to 25 wt % of the vinyl cyanide compound and 75 wt % to 78 wt % of the aromatic vinyl compound.

The aromatic vinyl compound-vinyl cyanide compound copolymer (B") with the vinyl cyanide compound content of 22 wt % to 25 wt % may have a weight average molecular weight of 150,000 g/mol to 160,000 g/mol.

The aromatic vinyl compound-vinyl cyanide compound copolymer (B) with the vinyl cyanide compound content of 32 wt % to 35 wt % may be included in a larger amount than the aromatic vinyl compound-vinyl cyanide compound copolymer (B') with the vinyl cyanide compound content of 27 wt % to 30 wt %. In this case, the thermoplastic resin composition according to an embodiment may exhibit improved impact resistance and an appearance of a molded product using the same may be greatly improved.

The aromatic vinyl compound-vinyl cyanide compound copolymer (B) with the vinyl cyanide compound content of 32 wt % to 35 wt % may be included in an amount of 8 wt % to 22 wt % based on 100 wt % of the thermoplastic resin composition and the aromatic vinyl compound-vinyl cyanide compound copolymer (B') with the vinyl cyanide compound content of 27 wt % to 30 wt % may be included in an amount of 7 wt % to 12 wt % based on 100 wt % of the thermoplastic resin composition. When the amounts of the aromatic vinyl compound-cyanide vinyl compound copolymer are out of the above-mentioned ranges, compatibility with the polycarbonate resin may be deteriorated and painting properties may be deteriorated.

(C-1, C-2) Acrylonitrile-Butadiene-Styrene Graft Copolymer and Acrylonitrile-Butadiene-Styrene Copolymer Including the Same An acrylonitrile-butadiene-styrene graft copolymer may have a core-shell structure including a core formed of a butadiene-based rubber polymer and a shell formed around the core through a graft polymerization reaction of acrylonitrile and styrene with the core.

The rubber polymer forming the core particularly improves impact strength at a low temperature, and the shell components are disposed in a continuous phase, for example, on the interface of an aromatic vinyl compound-vinyl cyanide compound copolymer and the rubber polymer and accordingly, may lower an interface tension and thus decrease a particle size of the rubber polymer in a dispersed phase and in addition, improve adhesion on the interface.

The acrylonitrile-butadiene-styrene graft copolymer may include two types of acrylonitrile-butadiene-styrene graft copolymers including rubber polymers having different average particle diameters.

Herein, the 'first acrylonitrile-butadiene-styrene graft copolymer' (C-1) and the 'second acrylonitrile-butadiene-styrene graft copolymer' (C-2) are referred in order to distinguish two different types of acrylonitrile-butadiene-styrene graft copolymers.

In the present invention, unless otherwise described, the average particle diameter is a volume average diameter, which refers to a Z-average particle diameter measured using a dynamic light scattering particle size analyzer.

The acrylonitrile-butadiene-styrene graft copolymer may be prepared by adding styrene and acrylonitrile to a butadiene-based rubber polymer and graft-copolymerizing the same through a general polymerization method such as emulsion polymerization, bulk polymerization, and the like.

The first acrylonitrile-butadiene-styrene graft copolymer (C-1) may include a rubber polymer having an average particle diameter of 200 nm to 350 nm, and preferably 250 nm to 350 nm.

The first acrylonitrile-butadiene-styrene graft copolymer (C-1) may include 20 wt % to 60 wt % of the butadiene-based rubber polymer, 20 wt % to 75 wt % of the styrene, and 5 wt % to 45 wt % of the acrylonitrile based on 100 wt % of the first acrylonitrile-butadiene-styrene graft copolymer (C-1).

The second acrylonitrile-butadiene-styrene graft copolymer (C-2) may include a rubber polymer having an average particle diameter of 400 nm to 600 nm, and preferably 450 nm to 550 nm.

The second acrylonitrile-butadiene-styrene graft copolymer (C-2) may include 20 wt % to 60 wt % of the butadiene-based rubber polymer, 20 wt % to 75 wt % of the styrene, and 5 wt % to 45 wt % of the acrylonitrile based on 100 wt % of the second acrylonitrile-butadiene-styrene graft copolymer (C-2).

The acrylonitrile-butadiene-styrene copolymer including the second acrylonitrile-butadiene-styrene graft copolymer (C-2) may be prepared by mixing the second acrylonitrile-butadiene-styrene graft copolymer (C-2) and an acrylonitrile-styrene copolymer and then melting/kneading the same, or adding styrene and acrylonitrile to a butadiene-based rubber polymer and performing a bulk polymerization.

The acrylonitrile-butadiene-styrene copolymer including the second acrylonitrile-butadiene-styrene graft copolymer (C-2) may include 15 wt % to 65 wt % of the second acrylonitrile-butadiene-styrene graft copolymer (C-2) and 35 wt % and 85 wt % of an acrylonitrile-styrene copolymer based on 100 wt % of the acrylonitrile-butadiene-styrene copolymer.

The acrylonitrile-butadiene-styrene copolymer including the second acrylonitrile-butadiene-styrene graft copolymer (C-2) may include 10 wt % to 25 wt % of the butadiene-based rubber polymer based on 100 wt % of the acrylonitrile-butadiene-styrene copolymer.

The acrylonitrile-butadiene-styrene copolymer including the second acrylonitrile-butadiene-styrene graft copolymer (C-2) may be included in an amount of 15 parts by weight to 40 parts by weight based on 100 parts by weight of the polycarbonate resin. When the acrylonitrile-butadiene-styrene copolymer including the second acrylonitrile-butadiene-styrene graft copolymer (C-2) is included in an amount of less than 15 parts by weight based on 100 parts by weight of the polycarbonate resin, painting properties of the thermoplastic resin composition may be deteriorated, but when included in an amount of greater than 40 parts by weight, impact resistance and heat resistance may be deteriorated.

In the thermoplastic resin composition, the acrylonitrile-butadiene-styrene graft copolymers including butadiene-based rubbers polymer having various particle diameters are mixed, and the first acrylonitrile-butadiene-styrene graft copolymer (C-1) having an average particle diameter of the butadiene-based rubber polymers in a range of 200 nm to 350 nm may be used in an amount of 10 wt % to 15 wt %, preferably, 12 wt % to 14 wt % based on 100 wt % of the thermoplastic resin composition. In addition, the acrylonitrile-butadiene-styrene copolymer including the second acrylonitrile-butadiene-styrene graft copolymer (C-2) having an average particle diameter of the butadiene-based rubber polymers in a range of 400 nm to 600 nm may be included in an amount of 6 wt % to 12 wt %, preferably, 8 wt % to 10 wt % based on 100 wt % of the thermoplastic resin composition. When the first acrylonitrile-butadiene-styrene graft copolymer (C-1) and the acrylonitrile-butadiene-styrene copolymer including the second acrylonitrile-butadiene-styrene graft copolymer (C-2) are distributed out of the content range, painting properties of the thermoplastic resin composition may be deteriorated.

(D) Polybutylene Terephthalate Resin

The polybutylene terephthalate resin is in general obtained through a polycondensation reaction of terephthalic acid or a derivative thereof with 1,4-butanediol or a derivative thereof but through a copolymerization of dicarboxylic acid, glycol, or the like, unless the purpose of the present disclosure is damaged.

Herein, examples of the copolymerizable dicarboxylic acid may be isophthalic acid, 2-chloro terephthalic acid, 2,5-dichloroterephthalic acid, 2-methylterephthalic acid, 4,4-stilbenedicarboxylic acid, 4,4-biphenyldicarboxylic acid, orthophthalic acid, 2,6-naphthalene dicarboxylic acid, bisbenzoic acid, bis(p-carboxylphenyl) methane, anthracene dicarbonic acid, 4,4-diphenyletherdicarboxylic acid, 4,4-diphenoxyethanedicarbonic acid, adipic acid, sebacic acid, azelaic acid, dodecane diacid, 1,3-cyclohexanedicarboxylic acid, 1,4-cyclohexanedicarboxylic acid, and the like. The copolymerizable dicarboxylic acid may be for example exemplified and examples thereof may be used alone or as a mixture of two or more types.

On the other hand, the copolymerizable glycol may be ethylene glycol, 1,2-propylene glycol, 1,3-propanediol, 2,2-dimethyl-1,3-propanediol, trans-2,2,4,4,-tetramethyl-1,3-cyclobutane diol, cis-2,2,4,4,-tetramethyl-1,3-cyclobutane diol, neopentylglycol, 1,5-pentanediol, 1,6-hexanediol, 1,4-cyclohexanedimethanol, 1,3-cyclohexanedimethanol, decamethylene glycol, cyclohexane diol, p-xylene diol, bisphenol A, tetrabromo bisphenol A, tetrabromo bisphenol A-bis (2-hydroxyethylether), and the like. The copolymerizable glycol may be for example exemplified and examples thereof may be used alone or as a mixture of two or more types.

In addition, the polybutylene terephthalate resin may have intrinsic viscosity ranging from 0.7 to 1.50 dl/g in order to sufficiently secure impact resistance of a molded product formed by using a thermoplastic resin composition.

In addition, the polybutylene terephthalate resin (D) may be included in an amount of 3 wt % to 8 wt % based on 100 wt % of the thermoplastic resin composition. When the polybutylene terephthalate resin (D) is included in an amount of less than 3 wt %, a weld line is formed in a molded product, impact resistance is deteriorated, and accordingly, painting properties and appearance characteristics may be deteriorated. In addition, when the polybutylene terephthalate resin is included in amount of greater than 6 wt %, heat resistance may be deteriorated, and a color stain may be generated.

(E) Compatibilizer

A compatibilizer (E) is a material improving compatibility of components of the thermoplastic resin composition and may include an acryl-based compound and an acryl-based copolymer of a compound copolymerizable with the acryl-based compound.

The acryl-based copolymer includes at least one kind of acryl-based compound as a repeating unit and may be obtained by copolymerizing an acryl-based compound; and an aromatic vinyl-base compound copolymerizable with the acryl-based compound, a heterogeneous acryl-based compound differing from the acryl-based compound, a heterocyclic compound, or a combination thereof. Preferably, the acryl-based copolymer may be a copolymer of the acryl-based compound and the heterogeneous acryl-based compound differing from the acryl-based compound.

The acryl-based compound may be methacrylic acid alkyl ester, methacrylic acid ester, or a combination thereof. Herein, the alkyl may be C1 to C10 alkyl. Specific examples of the methacrylic acid alkyl ester may be methylmethacrylate, ethylmethacrylate, propylmethacrylate, butylmetaacrylate, and the like, and preferably methylmethacrylate.

The heterocyclic compound may be a substituted or unsubstituted C2 to C20 heterocycloalkyl compound, a substituted or unsubstituted C2 to C20 heterocycloalkenyl compound, or a substituted or unsubstituted C2 to C20 heterocycloalkynyl compound. Specific examples of the heterocyclic compound may be maleic anhydride, alkyl or phenyl N-substituted maleimide, and the like.

Preferable examples of the acryl-based copolymer may be a copolymer of methylmethacrylate and ethylacrylate.

In addition, the acryl-based copolymer may be a copolymer of a monomer mixture including 30 wt % to 70 wt % of the methylmethacrylate and 70 wt % to 30 wt % of the ethylacrylate, and within the ratio, compatibility of the polycarbonate resin and the acrylonitrile-butadiene-styrene graft copolymer may be improved.

The acryl-based copolymer may have a weight average molecular weight of 100,000 g/mol to 10,000,000 g/mol, preferably 1,000,000 g/mol to 10,000,000 g/mol, more preferably 1,000,000 g/mol to 8,000,000 g/mol, and even more preferably 3,000,000 g/mol to 6,000,000 g/mol. When the acryl-based copolymer has a weight average molecular weight within the range, morphology of the thermoplastic resin composition is stabilized without deteriorating flowability in a shear rate region during the injection molding.

As needed, the acryl-based copolymer may be used alone or in a mixture of two or more.

The compatibilizer may be included in an amount of 1 wt % to 5 wt %, and preferably 2 wt % to 4 wt % based on 100 wt % of the thermoplastic resin composition. When the compatibilizer is included in an amount of less than 1 wt %, compatibility of the polycarbonate resin with the acrylonitrile-butadiene-styrene graft copolymer may be deteriorated, and when the compatibilizer is included in an amount of greater than 5 wt %, flowability of the thermoplastic resin composition may be deteriorated and thus difficult to process.

(F) Other Additives

The thermoplastic resin composition may further include additives optionally in accordance with its use. The additives may include flame retardants, lubricants, plasticizers, heat stabilizers, antioxidants, light stabilizers, or colorants and two or more types may be mixed in accordance with characteristics of final molded products.

The flame retardant is a material for reducing flammability and may include at least one of a phosphate compound, a phosphite compound, a phosphonate compound, a polysiloxane, a phosphazene compound, a phosphinate compound, or a melamine compound, but is not limited thereto.

The lubricant plays a role of smoothening the surface of a metal contacting with the thermoplastic resin composition during the process molding extrusion and thus helping a flow or movement of the resin composition.

The plasticizer may be generally used to increase flexibility, process workability, or expansion property of the thermoplastic resin composition and may be any generally-used materials.

The heat stabilizer may suppress a thermal decomposition of the thermoplastic resin composition when kneaded or molded at a high temperature and may be any generally-used materials.

The antioxidant may suppress or block a chemical reaction of the thermoplastic resin composition with oxygen and thus prevent decomposition of the resin composition and loss of its intrinsic properties and include at least one of phenol-type, phosphate-type, thioether-type, or amine-type antioxidants, but is not limited thereto.

The light stabilizer suppresses or blocks decomposition of the thermoplastic resin composition from ultraviolet (UV) and thus its color change or mechanical property loss and specifically, may include at least one of hindered phenol type, benzophenone type, or benzotriazole type light stabilizers, but is not limited thereto.

The colorant may include a general pigment or dye.

The additives may be included in an amount of 1 part by weight to 15 parts by weight based on 100 parts by weight of the thermoplastic resin composition.

The thermoplastic resin composition according to the present invention may be prepared in a well-known method of preparing a resin composition.

For example, the thermoplastic resin composition according to the present disclosure may be manufactured into a pellet by mixing components and other additives simultaneously and melt-extruding the same in an extruder.

A molded product according to an example embodiment of the present disclosure may be manufactured from the thermoplastic resin composition. The thermoplastic resin composition has excellent impact resistance and painting properties and thus may be limitlessly applied to a molded product required of excellent impact resistance and painting properties and specifically, an interior or exterior material for a vehicle.

Hereinafter, the present invention is illustrated in more detail with reference to examples and comparative examples. However, the following examples and comparative examples are provided for the purpose of descriptions and the present invention is not limited thereto.

EXAMPLES 1 TO 7 AND COMPARATIVE EXAMPLES 1 TO 7

The thermoplastic resin compositions according to examples and comparative examples were prepared according to the component content ratios described in Table 1 and Table 2. A total amount of the thermoplastic resin composition was 100 wt % and a content of each component was expressed as wt %.

The components shown in Tables 1 and 2 were dry-mixed, consecutively dispensed quantitively in a feed section of a twin-screw extruder (L/D=29, Φ=45 mm), and melted/kneaded. Subsequently, a thermoplastic resin composition prepared into a pellet through the twin-screw extruder was dried at about 80° C. for about 2 hours, and the pellet was injection-molded into specimens for measuring properties, 2 mm-thick specimens for measuring spiral flows in order to evaluate moldability, and 20 cm×5 cm×0.2 cm specimens for evaluating painting properties/chemical resistance through a 6 oz injection molding machine by setting a cylinder temperature at about 260° C. and a molder temperature at about 60° C.

TABLE 1

(unit: wt %)

|     | Example 1 | Example 2 | Example 3 | Example 4 | Example 5 | Example 6 | Example 7 |
|-----|-----------|-----------|-----------|-----------|-----------|-----------|-----------|
| (A) | 50 | 50 | 50 | 50 | 50 | 52 | 45 |
| (B) | 14 | 22 | 14 | 8 | 14 | 14 | 14 |
| (B') | 8 | — | — | 7 | 8 | 8 | 8 |
| (B") | — | — | 8 | 7 | — | — | — |
| (C-1) | 13 | 13 | 13 | 13 | 13 | 13 | 13 |
| (C-2) | 9 | 9 | 9 | 9 | 9 | 9 | 9 |
| (D) | 3 | 3 | 3 | 3 | 5 | 1 | 8 |
| (E) | 3 | 3 | 3 | 3 | 1 | 3 | 3 |

(E) Compatibilizer

TABLE 2

(unit: wt %)

|     | Comparative Example 1 | Comparative Example 2 | Comparative Example 3 | Comparative Example 4 | Comparative Example 5 | Comparative Example 6 | Comparative Example 7 |
|-----|---|---|---|---|---|---|---|
| (A) | 50 | 50 | 50 | 50 | 50 | 30 | 70 |
| (B) | 28 | 25 | 25 | — | — | 19 | 8 |
| (B') | — | — | — | — | 22 | 13 | 4 |
| (B") | — | — | — | 22 | — | — | — |
| (C-1) | 13 | 13 | 13 | 13 | 13 | 19 | 8 |
| (C-2) | 9 | 9 | 9 | 9 | 9 | 13 | 4 |
| (D) | — | — | 3 | 3 | 3 | 3 | 3 |
| (E) | — | 3 | — | 3 | 3 | 3 | 3 |

Descriptions for each component in Table 1 and Table 2 are as follows.

(A) Polycarbonate Resin

Bisphenol-A polycarbonate resin having a weight average molecular weight of about 25,000 g/mol (Lotte Advanced Materials Co., Ltd.)

(B) Aromatic Vinyl Compound-Vinyl Cyanide Compound Copolymer

Styrene-acrylonitrile copolymer (SAN) resin (Lotte Advanced Materials Co., Ltd.) wherein an acrylonitrile content was 35 wt %, a styrene content was 65 wt %, and a weight average molecular weight was about 100,000 g/mol.

(B') Aromatic Vinyl Compound-Vinyl Cyanide Compound Copolymer

Styrene-acrylonitrile copolymer (SAN) resin wherein an acrylonitrile content was 30 wt %, a styrene content was 70 wt %, and a weight average molecular weight was about 130,000 g/mol (Lotte Advanced Materials Co., Ltd.)

(B") Aromatic Vinyl Compound-Vinyl Cyanide Compound Copolymer

Styrene-acrylonitrile copolymer (SAN) resin (Lotte Advanced Materials Co., Ltd.) wherein an acrylonitrile content was 24 wt %, a styrene content was 76 wt %, and a weight average molecular weight was about 150,000 g/mol.

(C-1) Acrylonitrile-Butadiene-Styrene Graft Copolymer

Acrylonitrile-butadiene-styrene graft copolymer (Lotte Advanced Materials Co., Ltd.) wherein a butadiene rubber content was 50 wt % and an average particle diameter of a rubber was about 350 nm.

(C-2) Acrylonitrile-Butadiene-Styrene Copolymer

Acrylonitrile-butadiene-styrene copolymer resin (Lotte Advanced Materials Co., Ltd.) wherein a butadiene rubber content was 12 wt % and an average particle diameter of a rubber was about 500 nm.

(D) Polybutylene Terephthalate Resin

Polybutylene terephthalate resin (K001, Shinkong Corp.) having an intrinsic viscosity of 0.83 dl/g.

Ethylacrylate-methylmethacrylate copolymer (Paraloid K125P, Dow Chemical Company)

Experimental Results

The experimental results are shown in Table 3 and Table 4.

(1) Izod impact strength (kgf·cm/cm): measured regarding an ⅛"-thick notched specimen at each temperature according to ASTM D256.

(2) HDT (° C.): measured regarding a ¼"-thick specimen under a load condition of 1.82 MPa according to ASTM D648.

(3) Spiral flow length (mm): obtained to compare molding properties of the resin compositions by measuring how much each resin compositions filled a mold only due to its own melt viscosity characteristics after minimizing an injection pressure and a holding pressure at an injection molding temperature of 250° C. In other words, the longer the mold filled with a resin composition was, the better molding properties were.

(4) Painting Appearance: a 20 cm×5 cm×0.2 cm specimen was injection-molded at a predetermined injection speed through one gate and then, coated by a metal silver painting solution (VZ-21SV75, Econet Co.) with an air gun and dried at 60° C. for 30 minutes. Appearance defect degrees such as a flow mark, an erosion, a crack, the like on the surface of the specimen were compared, and when there was no appearance defect, 10 was given, while when the appearance defect was extremely severe, 1 was given.

(5) Appearance after thinner-dipping: a 20 cm×5 cm×0.2 cm specimen was injection-molded through one gate at a predetermined injection speed, dipped in a thinner (Aekyung Paint Co., Ltd.) for 2 minutes, and dried. Appearance defect degrees such as a flow mark, an erosion, a crack, the like on the surface of the specimen dipped in the thinner were compared, and when there was no appearance defect, 10 was given, while when the appearance defect was extremely severe, 1 was given.

TABLE 3

|  | Example 1 | Example 2 | Example 3 | Example 4 | Example 5 | Example 6 | Example 7 |
|---|---|---|---|---|---|---|---|
| Izod Impact strength (23° C.) | 60 | 50 | 52 | 55 | 55 | 58 | 52 |
| Izod Impact strength (−30° C.) | 25 | 21 | 23 | 22 | 22 | 23 | 15 |
| HDT | 105 | 104 | 104 | 104 | 101 | 105 | 99 |
| Spiral flow length (250° C.) | 340 | 350 | 330 | 310 | 355 | 335 | 360 |
| Painting appearance | 10 | 8 | 8 | 9 | 9 | 7 | 10 |
| Appearance after dipping it in thinner | 10 | 9 | 7 | 8 | 9 | 8 | 10 |

TABLE 4

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Izod Impact strength (23° C.) | 55 | 65 | 50 | 60 | 55 | 50 | 45 |
| Izod Impact strength (−30° C.) | 13 | 15 | 10 | 24 | 22 | 8 | 12 |
| HDT | 105 | 104 | 103 | 105 | 104 | 97 | 111 |
| Spiral flow length (250° C.) | 355 | 340 | 355 | 275 | 320 | 320 | 290 |
| Painting appearance | 3 | 5 | 6 | 6 | 6 | 2 | 8 |
| Appearance after dipping it in thinner | 2 | 4 | 6 | 5 | 4 | 1 | 7 |

Referring to Tables 3 and 4, a thermoplastic resin composition may have excellent chemical resistance, impact resistance, and painting properties as well as maintain flowability by using each optimal amount of a polycarbonate resin, an aromatic vinyl compound-vinyl cyanide compound copolymer, an acrylonitrile-butadiene-styrene graft copolymer having a different average particle diameter, a polybutylene terephthalate resin, and a compatibilizer.

The present invention is not limited to the example embodiments but may be manufactured in a variety of different forms. It will be understood that the person skilled in the art in the field of the present invention may be embodied in other specific forms without altering the technical idea or essential features of the present invention. Therefore, the aforementioned embodiments should be understood to be exemplary but not limiting the present invention in any way.

The invention claimed is:

1. A thermoplastic resin composition, comprising
   (A) 40 wt % to 60 wt % of a polycarbonate resin;
   (B) 8 wt % to 22 wt % of an aromatic vinyl compound-vinyl cyanide compound copolymer with a vinyl cyanide compound content of 32 wt % to 35 wt %;
   (C-1) 10 wt % to 15 wt % of a first acrylonitrile-butadiene-styrene graft copolymer with an average particle diameter of a rubber polymer of 200 nm to 350 nm;
   (C-2) 6 wt % to 12 wt % of an acrylonitrile-butadiene-styrene copolymer comprising a second acrylonitrile-butadiene-styrene graft copolymer with an average particle diameter of a rubber polymer of 400 nm to 600 nm;
   (D) 3 wt % to 8 wt % of a polybutylene terephthalate resin; and
   (E) 1 wt % to 5 wt % of a compatibilizer,
   based on a total amount of the thermoplastic resin composition.

2. The thermoplastic resin composition of claim 1, wherein the aromatic vinyl compound-vinyl cyanide compound copolymer with a vinyl cyanide compound content of 32 wt % to 35 wt % has a weight average molecular weight of 100,000 g/mol to 120,000 g/mol.

3. The thermoplastic resin composition of claim 1, wherein the thermoplastic resin composition further comprises (B') an aromatic vinyl compound-vinyl cyanide compound copolymer with a vinyl cyanide compound content of 27 wt % to 30 wt %.

4. The thermoplastic resin composition of claim 3, wherein the aromatic vinyl compound-vinyl cyanide compound copolymer (B') with the vinyl cyanide compound content of 27 wt % to 30 wt % has a weight average molecular weight of 130,000 g/mol to 140,000 g/mol.

5. The thermoplastic resin composition of claim 3, comprising the aromatic vinyl compound-vinyl cyanide compound copolymer (B) with the vinyl cyanide compound content of 32 wt % to 35 wt % in a larger amount than the aromatic vinyl compound-vinyl cyanide compound copolymer (B') with the vinyl cyanide compound content of 27 wt % to 30 wt %.

6. The thermoplastic resin composition of claim 5, comprising:
   (A) 40 wt % to 60 wt % of the polycarbonate resin;

(B) 8 wt % to 22 wt % of the aromatic vinyl compound-vinyl cyanide compound copolymer with the vinyl cyanide compound content of 32 wt % to 35 wt %;

(B') 7 wt % to 12 wt % of the aromatic vinyl compound-vinyl cyanide compound copolymer with the vinyl cyanide compound content of 27 wt % to 30 wt %;

(C-1) 10 wt % to 15 wt % of the first acrylonitrile-butadiene-styrene graft copolymer with the average particle diameter of the rubber polymer of 200 nm to 350 nm;

(C-2) 6 wt % to 12 wt % of the acrylonitrile-butadiene-styrene graft copolymer including the second acrylonitrile-butadiene-styrene graft copolymer with the average particle diameter of the rubber polymer of 400 nm to 600 nm;

(D) 3 wt % to 8 wt % of the polybutylene terephthalate resin; and (E) 1 wt % to 5 wt % of the compatibilizer, based on a total amount of the thermoplastic resin composition.

7. The thermoplastic resin composition of claim 1, wherein the vinyl cyanide compound of the aromatic vinyl compound-vinyl cyanide compound copolymer is selected from the group consisting of acrylonitrile, methacrylonitrile, fumaronitrile, and combinations thereof.

8. The thermoplastic resin composition of claim 1, wherein the aromatic vinyl compound in the aromatic vinyl compound-vinyl cyanide compound copolymer is selected from the group consisting of styrene, α-methylstyrene, and combinations thereof which are substituted or unsubstituted with a halogen or a C1 to C10 alkyl group.

9. The thermoplastic resin composition of claim 1, wherein the aromatic vinyl compound-vinyl cyanide compound copolymer is a styrene-acrylonitrile copolymer (SAN).

10. The thermoplastic resin composition of claim 1, comprising the second acrylonitrile-butadiene-styrene graft copolymer (C-2) in an amount of 15 parts by weight to 18 parts by weight based on 100 parts by weight of the polycarbonate resin (A).

11. The thermoplastic resin composition of claim 1, wherein the compatibilizer (E) is a copolymer of an acryl-based compound and a compound copolymerizable with the acryl-based compound.

12. The thermoplastic resin composition of claim 11, wherein the compatibilizer (E) comprises a copolymer of ethylacrylate and methylmethacrylate.

13. The thermoplastic resin composition of claim 12, wherein the compatibilizer (E) is a copolymer of a monomer mixture including 30 wt % to 70 wt % of the ethylacrylate and 70 wt % to 30 wt % of the methylmethacrylate.

14. A molded product using the thermoplastic resin composition of claim 1.

* * * * *